TRANSISTOR SQUELCH SYSTEM OR THE LIKE

Filed April 30, 1957 2 Sheets-Sheet 1

FRANK C. CARPENTER JR.
*INVENTOR.*

BY [signature]
HIS ATTORNEY

June 24, 1958 F. C. CARPENTER, JR 2,840,699

TRANSISTOR SQUELCH SYSTEM OR THE LIKE

Filed April 30, 1957 2 Sheets-Sheet 2

United States Patent Office 2,840,699
Patented June 24, 1958

2,840,699

TRANSISTOR SQUELCH SYSTEM OR THE LIKE

Frank C. Carpenter, Jr., Sierra Madre, Calif., assignor to Hoffman Electronics Corporation, a corporation of California Application April 30, 1957, Serial No. 656,042

7 Claims. (Cl. 250—20)

This invention is related to squelch systems in general and, more particularly, to a new and improved transistor squelch system the operation level of which may be controlled.

Principal objects of the present invention include the provision of a squelch system or circuit employing transistors rather than vacuum tubes, which squelch system may be selectively adjusted for the level of squelch operation desired.

According to the present invention, detector and squelch stages incorporating complementary transistors are intercoupled by means of a common resistor, for example, which serves as an output load resistor for the detector stage and also as an input base resistor for the squelch stage. Quiescent detector current through the aforementioned resistor impresses a bias upon the squelch stage. The effect of this bias, so far as squelch operation level is concerned, is controlled by selectively adjusting the emitter operating potential of the squelch transistor.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, Figure 1 is a schematic diagram of a first embodiment of the present invention.

Figure 2:
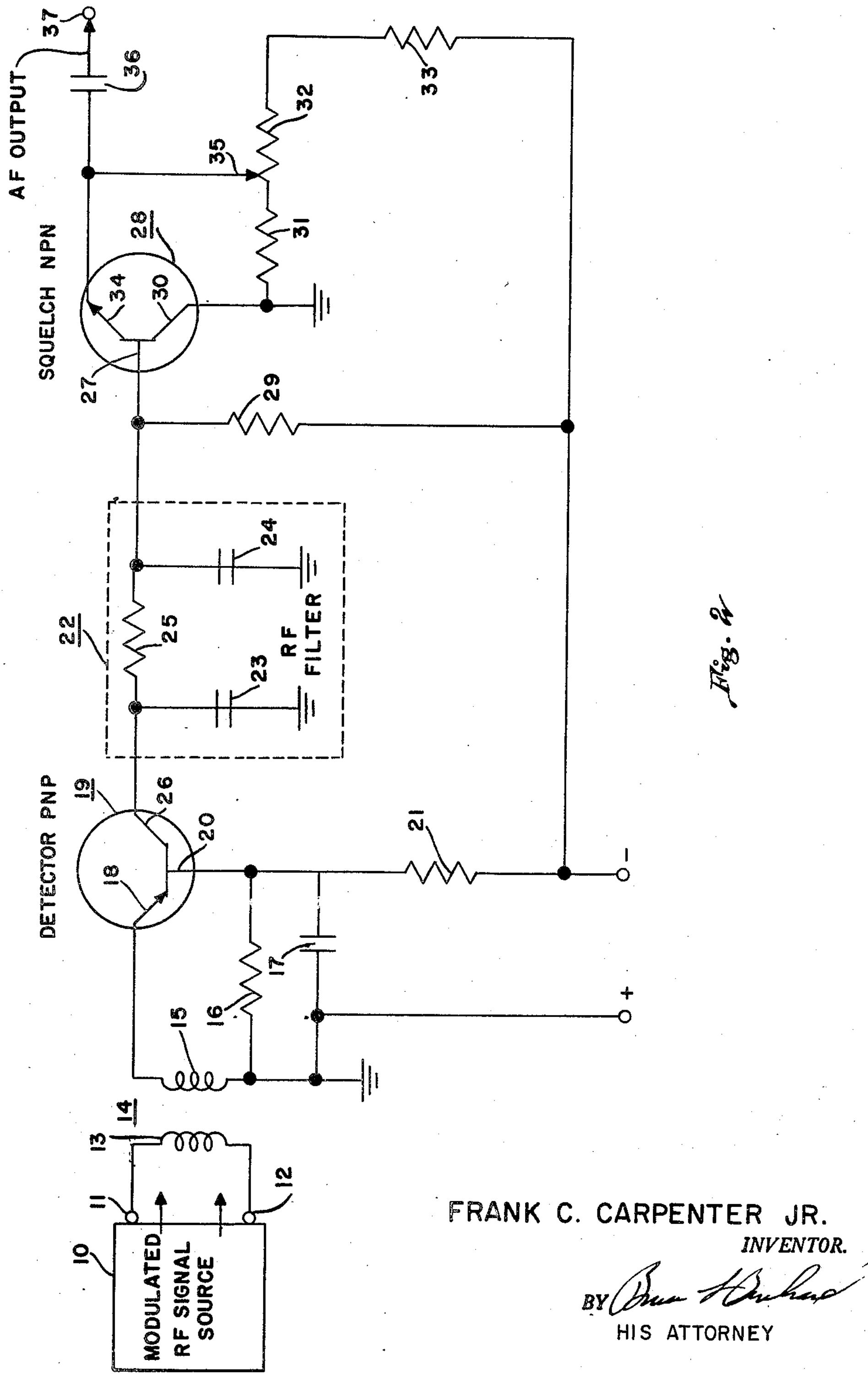

Figure 2 is a schematic diagram of a second embodiment of the present invention.

Figure 1:
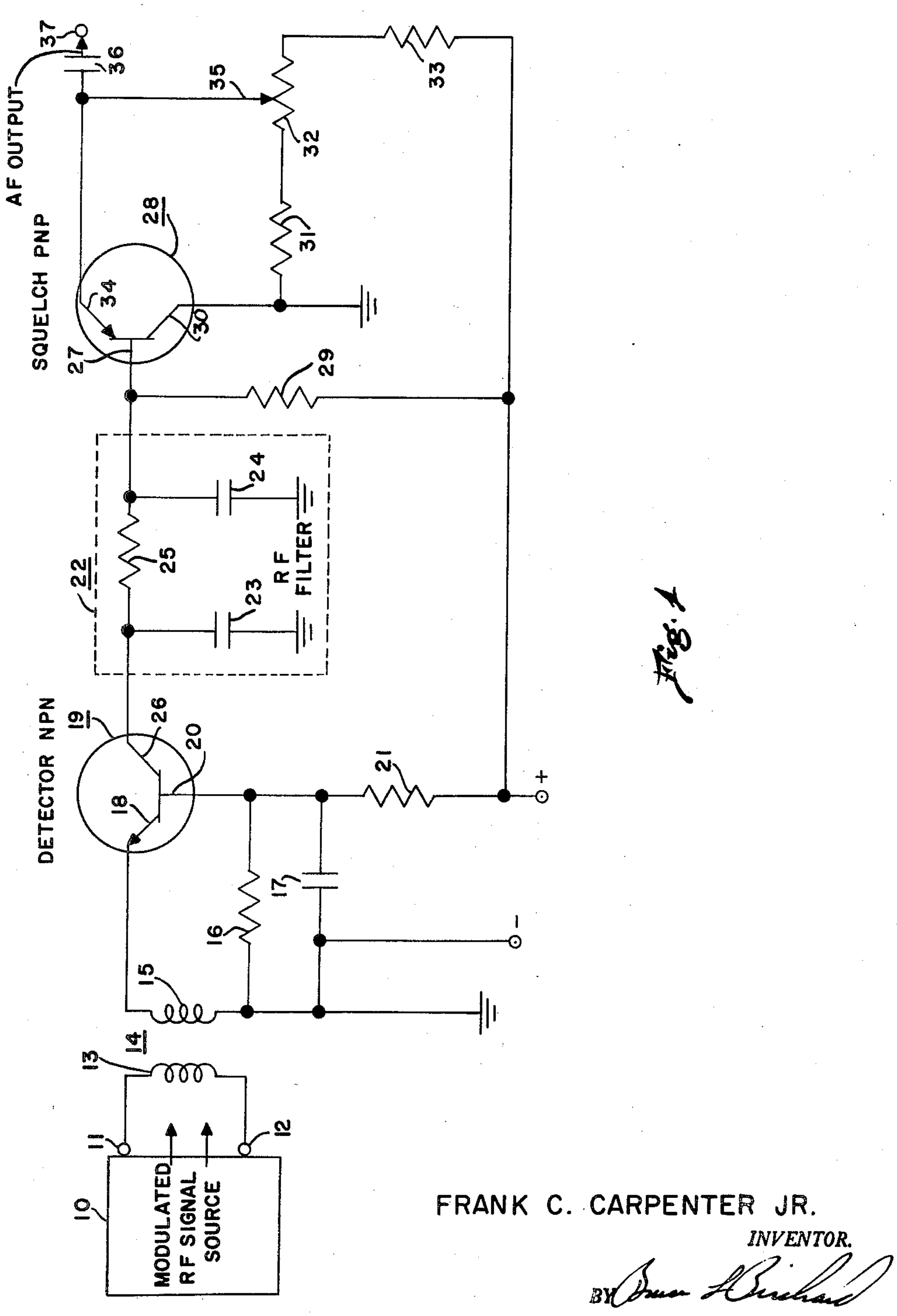

In Figure 1, modulated ratio frequency signal source 10 is coupled across input terminals 11 and 12, these terminals being shunted by primary winding 13 of input transformer 14. Secondary winding 15 of input transformer 14 is coupled at one end thereof to resistor 16, to capacitor 17, and to ground as shown. The remaining end of secondary winding 15 of input transformer 14 is directly connected to the emitter 18 of NPN detector transistor 19. Base 20 of transistor 19 is coupled to the remaining ends of resistor 16 and capacitor 17, and through resistor 21 to a source of positive operating potential. The ground reference of this system, as shown, is maintained at a potential which is negative with respect to the aforementioned positive operating potential. Pi-type filter circuit 22, including capacitors 23 and 24 and resistor 25, is directly coupled between collector 26 of detector transistor 19 and base 27 of squelch PNP tranistor 28. Base 27 of transistor 28 is also coupled through resistor 29 to the aforementioned source of positive operating potential. Collector 30 of squelch transistor 28 is maintained at ground potential as shown and is also coupled through a voltage divider circuit including series connected resistors 31 and 33 and potentiometer 32 to the aforementioned source of positive operating potential. Emitter 34 of squelch transistor 28 is directly connected to movable contact 35 of potentiometer 32 and also to coupling capacitor 36 which is directly coupled to audio frequency output terminal 37.

The operation of the transistor circuit shown in Figure 1 is as follows. Resistors 16 and 21 form a voltage divider circuit for supplying bias to base 20 of transistor 19. The voltage applied to the base of transistor 19 should be adjusted so that the collector current of transistor 19 will approximate 200 microamperes or less. Capacitor 17 functions as a filter capacitor for the voltage divider circuit and filters out radio frequency and audio frequency components of the input signal derived from modulated signal source 10. The filter combination of resistor 25 and capacitors 23 and 24, found in the output circuit of transistor 19, form a simple, pi-type radio frequency filter for the detector circuit. The audio output signal derived from the negative half-cycle detector circuit across output load resistor 29 is fed into the input side of transistor 28. Resistor 29 should have a relatively large value. Across it, in the absence of an input signal, there will exist some small voltage drop due to the collector current of transistor 19. Because of this quiescent collector current, the base 27 of transistor 28 will be maintained at a potential which is slightly positive with respect to ground.

Resistor 31, potentiometer 32, and resistor 33 form a voltage divider circuit so that there may be supplied a potential, adjustable by virtue of the inclusion of potentiometer 32, to the emitter of transistor 28. Thus, the voltage supplied to the emitter 34 of transistor 28 may be adjusted to be of an order which is slightly less positive than base 27 thereof. Under this condition, base 27 will be slightly more positive than will emitter 34 of transistor 28 so that squelch transistor 28 will be in a non-conductive state. Hence, there will appear no output at the audio frequency output terminal 37.

The foregoing assumes that there is no modulated radio frequency signal applied to input terminals 11 and 12 of the circuit. When, however, an audio modulated, radio frequency signal is received at input terminals 11 and 12 in transformer 14, there will exist an increase in collector current of detector transistor 19. Audio frequency and radio frequency components of this kind will of course be filtered out by capacitor 17. Radio frequency components of the collector current will also be filtered by the pi-type filter 22, and hence the detected audio output will appear across load resistor 29 and subsequently fed into the input side of squelch transistor 28. The resultant increase in current through resistor 29 will of course produce an additional voltage drop across this resistor. The result will be that there will be a reduction in the positive potential applied to base 27 of transistor 28. The voltage applied to the emitter 34 is of course stabilized by virtue of the voltage divider circuit including potentiometer 32. Hence, the result is that there will be an alteration in the potential difference between base 27 and emitter 34 of transistor 28. This alteration in relative potential will in fact eliminate the positive character of the potential applied to the base relative to the emitter of the transistor so that the current will commence to flow.

The threshold of conduction of squelch PNP transistor 28 will of course be determined by the bias point set by potentiometer 32 in the aforementioned voltage divider circuit. For a given threshold setting, when sufficient signal strength is derived from modulated radio frequency signal source 10, then such signal will drive base 27 of transistor 28 negatively, to a point where transistor 28 will conduct, and by conduction thereof the emitter current of the transistor will produce an output audio frequency signal at output terminal 37. The potentiometer 32 may of course be adjusted so that the squelch transistor 28 (1) will conduct with no signal applied to detector transistor 19, (2) will not conduct with the presence of even a large signal applied to the detector, or (3) will conduct at a desired intermediate threshold level.

The circuit of Figure 2 is identical with that of Figure 1 with the exception that the complementary, detector and squelch transistors are reversed in character and the applied voltage reversed in polarity. Hence, in the Figure 2 embodiment the detector transistor will be of the PNP-type whereas the squelch transistor will be of the NPN-type. In this case, then, the "ground" of the system will be maintained at a positive operating potential whereas the base and collector of transistors 19 and 28, respectively, will be maintained at a negative operating potential.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A transistor detector and squelch circuit including, in combination, first and second transistors of complementary types each having a base, an emitter, and a collector; an input circuit having a first end terminal coupled to said emitter of said first transistor and a second end terminal maintained at a common reference potential; a source of intermediate, direct current potential coupled to said base of said first transistor; a radio frequency filter having a first end terminal coupled to said collector of said first transistor and a second end terminal; an output load impedance having a first end terminal coupled to said second end terminal of said filter and a second end terminal maintained at a high potential relative to said common and intermediate potentials; said base of said second transistor being coupled to the junction of said filter and said output load impedance; said collector of said second transistor being maintained at said common reference potential; a voltage divider having first and second end terminals maintained at said common reference potential and said high potential, respectively, and a tap, said voltage divider tap being coupled to said emitter terminal of said second transistor; and an output coupling capacitor coupled to said emitter of said second transistor.

2. A transistor detector and squelch circuit including, in combination, first and second transistors of complementary types each having a base, an emitter, and a collector; an input circuit having a first end terminal coupled to said emitter of said first transistor and a second end terminal maintained at a common reference potential; a source of intermediate, direct current potential coupled to said base of said first transistor; a radio frequency filter having a first end terminal coupled to said collector of said first transistor and a second end terminal; an output load resistor having a first end terminal coupled to said second end terminal of said filter and a second end terminal maintained at a high potential relative to said common and intermediate potentials; said base of said second transistor being coupled to the junction of said filter and said output load resistor; said collector of said second transistor being maintained at said common reference potential; a voltage divider having first and second end terminals maintained at said common reference potential and said high potential, respectively, and a tap, said voltage divider tap being coupled to said emitter terminal of said second transistor; and an output coupling capacitor coupled to said emitter of said second transistor.

3. A transistor detector and squelch circuit including, in combination, first and second transistors of complementary types each having a base, an emitter, and a collector, said first transistor being of the NPN-type and said second transistor being of the PNP-type; an input circuit having a first end terminal coupled to said emitter of said first transistor and a second end terminal maintained at a common reference potential; a source of intermediate direct current, positive potential coupled to said base of said first transistor; a radio frequency filter having a first end terminal coupled to said collector of said first transistor and a second end terminal; an output load resistor having a first end terminal coupled to said second end terminal of said filter and a second end terminal maintained at a high positive potential relative to said common and intermediate potentials; said base of said second transistor being coupled to the junction of said filter and said output load resistor; said collector of said second transistor being maintained at said common reference potential; a voltage divided having first and second end terminals maintained at said common reference potential and said high positive potential, respectively, and a tap, said voltage divider tap being coupled to said emitter terminal of said second transistor; and an output coupling capacitor coupled to said emitter of said second transistor.

4. A transistor detector and squelch circuit including, in combination, first and second transistors of complementary types each having a base, an emitter, and a collector, said first transistor being of the PNP-type and said second transistor being of the NPN-type; an input circuit having a first end terminal coupled to said emitter of said first transistor and a second end terminal maintained at a common reference potential; a source of intermediate, direct current, negative potential coupled to said base of said first transistor; a radio frequency filter having a first end terminal coupled to said collector of said first transistor and a second end terminal; an output load resistor having a first end terminal coupled to said second end terminal of said filter and a second end terminal maintained at a high negative potential relative to said common and intermediate potentials; said base of said second transistor being coupled to the junction of said filter and said output load resistor; said collector of said second transistor being maintained at said common reference potential; a voltage divider having first and second end terminals maintained at said common reference potential and said high negative potential, respectively, and a tap, said voltage divider tap being coupled to said emitter terminal of said second transistor; and an output coupling capacitor coupled to said emitter of said second transistor.

5. A transistor detector and squelch circuit including, in combination, first and second transistors of complementary types each having a base, an emitter, and a collector; an input circuit having a first end terminal coupled to said emitter of said first transistor and a second end terminal maintained at a common reference potential; a source of intermediate, direct current potential coupled to said base of said first transistor; a radio frequency filter having a first end terminal coupled to said collector of said first transistor and a second end terminal; an output load resistor having a first end terminal coupled to said second end terminal maintained at a high potential relative to said common and intermediate potential; said base of said second transistor being coupled to the junction of said filter and said output load resistor; said collector of said second transistor being maintained at said common reference potential; a voltage divider having first and second end terminals maintained at said common reference potential and said high potential, respectively, and also an adjustable tap, said voltage divider adjustable tap being coupled to said emitter terminal of said second transistor; and an output coupling capacitor coupled to said emitter of said second transistor.

6. A transistor detector and squelch circuit including, in combination, first and second transistors of complementary types each having a base, an emitter, and a collector; an input circuit having a first end terminal coupled to said emitter of said first transistor and a second end terminal maintained at a common reference potential; a first voltage divided having first and second, series-connected resistors coupled between said common reference potential and a point of operating potential, and a capacitor shunting said first resistor, the junction of said first and second resistors being coupled to said base of said first transistor; a radio frequency filter having a first end terminal coupled to said collector of said first transistor and a second end terminal; an output load resistor having a first end terminal coupled to said second end terminal of said filter and a second end terminal maintained at said point of operating potential; said base of said second transistor being coupled to the junction of said filter and said output load resistor; said collector of said second transistor being maintained at said common reference potential; a second voltage divider having first and second end terminals maintained at said common reference potential and said operating potential, respectively, and a tap, said voltage divider tap being coupled to said emitter terminal of said second transistor; and an output coupling capacitor coupled to said emitter of said second transistor.

7. A transistor detector and squelch circuit including, in combination, first and second transistors of complementary types each having a base, an emitter, and a collector; an input circuit having a first end terminal coupled to said emitter of said first transistor and a second end terminal maintained at a common reference potential; a first voltage divider having first and second, series-connected resistors coupled between said common reference potential and a point of operating potential, and a capacitor shunting said first resistor, the junction of said first and second resistors being coupled to said base of said first transistor; a radio frequency filter having a first end terminal coupled to said collector of said first transistor and a second end terminal; an output load resistor having a first end terminal coupled to said second end terminal of said filter and a second end terminal maintained at said point of operating potential; said base of said second transistor being coupled to the junction of said filter and said output load resistor; said collector of said second transistor being maintained at said common reference potential; a second voltage divider having first and second end terminals maintained at said common reference potential and said operating potential, respectively, and an adjustable tap, said voltage divider adjustable tap being coupled to said emitter terminal of said second transistor; and an output coupling capacitor coupled to said emitter of said second transistor.

No references cited.